INVENTOR.
Erich Rüchser

Dec. 18, 1962            E. RÜCHSER            3,068,897
SAFETY CONTROL MECHANISM FOR PRESSURE CIRCUITS
Filed Nov. 27, 1959            3 Sheets-Sheet 2

INVENTOR.
*Erich Rüchser*
BY

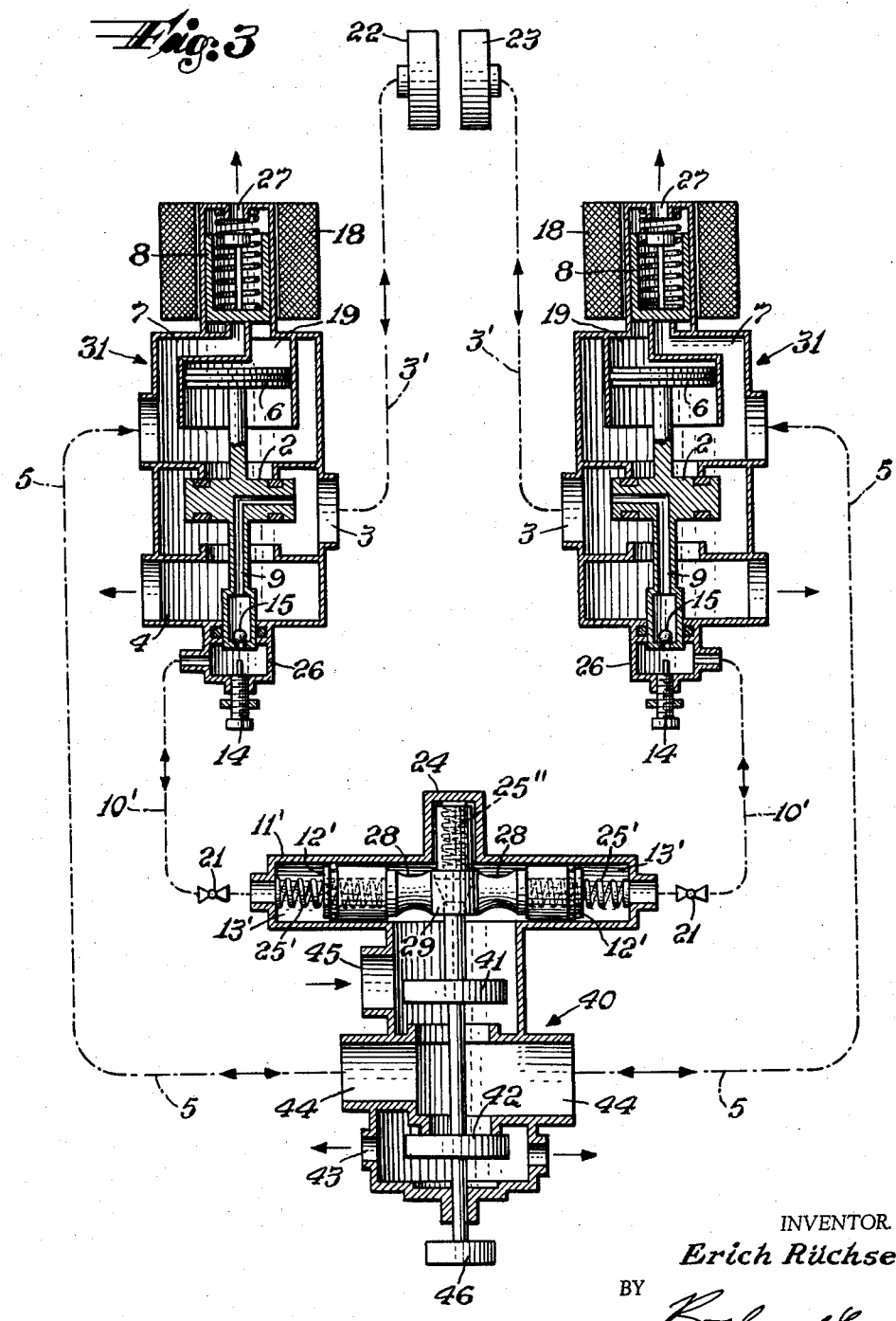

3,068,897
SAFETY CONTROL MECHANISM FOR
PRESSURE CIRCUITS
Erich Rüchser, Meimsheim, Wurttemberg, Germany, assignor to Erich Herion, Stuttgart-Frauenkopf, Wurttemberg, Germany
Filed Nov. 27, 1959, Ser. No. 855,913
Claims priority, application Germany Nov. 27, 1958
10 Claims. (Cl. 137—629)

The present invention relates to a safety control mechanism for the servo-pressure circuit of a press or similar pressure-consuming apparatus. The circuit is controlled by means of a reversing valve or by two valves connected in parallel to form a double valve. The valves are actuated by means of electrical switch contacts which automatically interrupt the operation of these valves if one of them should fail to operate or if only one is manually actuated.

Such reversing valves either of the multiway or straight-way types may be used for starting and stopping a machine tool equipped with a safety control circuit including a pair of electrical switch contacts which must be operated simultaneously before the machine tool can start to operate. If the control valves fail to operate, means should be provided for automatically preventing the machine tool from starting and for preventing it from being started by a repeated operation of the starting means.

The present invention provides a control mechanism utilizing conventional reversing valves of the multiway or straight-way type, in which the pressures in the two servo-pressure lines controlled by the control valves are compared with each other. When a difference in pressure between the lines occurs suitable disconnecting means act upon the electrical control circuit of the control valves or upon additional valve elements which shut the pressure fluid supply. If the control valves should again be actuated, such actuation will thus remain ineffective.

These and other objects, features, and advantages of the present invention will become further apparent from the following detailed description thereof, particularly when the same is read with reference to the accompanying drawings, in which—

FIGURE 3 shows a similar cross section of the control means for operating the clutch and brake of a press, each comprising a solenoid valve which is associated with an auxiliary valve.

Figure 1:
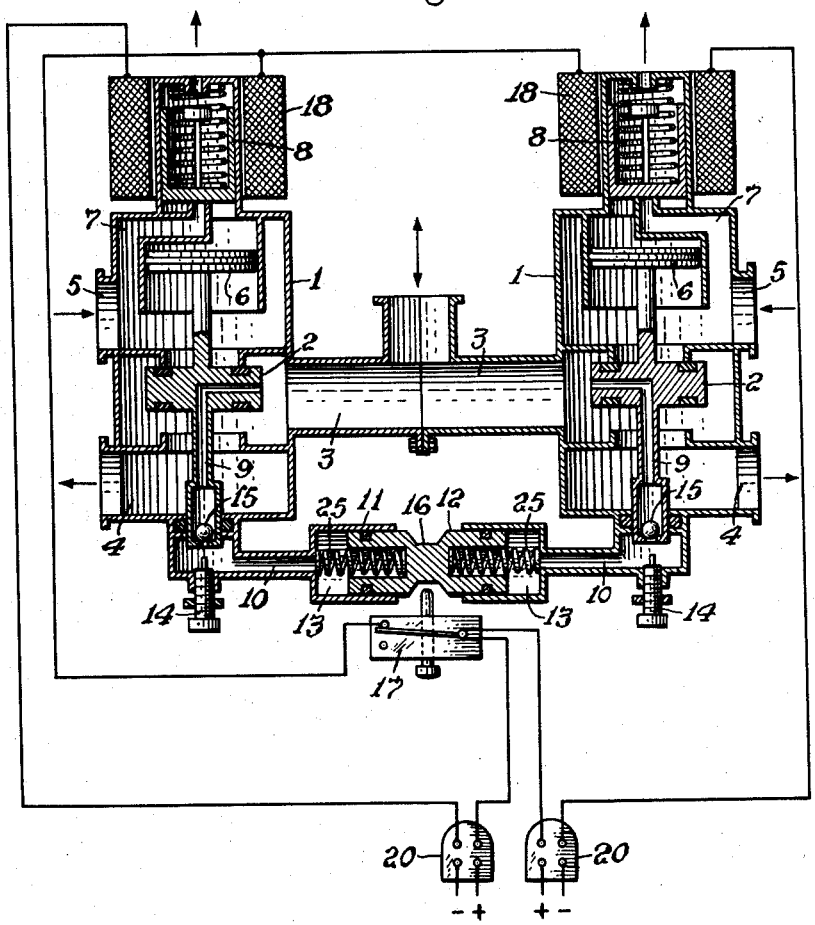
FIGURE 1 shows a diagrammatic cross section of a double-valve arrangement according to the invention for controlling the operation of the pressure-consuming element of a machine tool, particularly a press.

Referring first to FIGURE 1, there is shown a valve arrangement according to the invention including a pair of valves connected in parallel. Each valve has a housing 1 containing a valve member 2 which is adapted to open and close one of two servo-pressure lines 3 which are connected to each other and lead to a pressure-consuming apparatus, for example, the work cylinder of a hydraulic or pneumatic press.

As illustrated in FIGURE 1, each of the valve members 2 is operated by means of a pilot piston 6 which is acted upon by fluid admitted from an auxiliary pressure line 7 branched off the main pressure inlet 5 of the housing 1 and controlled by a pilot solenoid valve 8 which releases pressure fluid from the working space of the piston 6 when it closes the line 7 as shown by the arrow.

The fluid pressures at the outlets of the housings 1 are transmitted through respective hollow valve spindles 9 of the valve members 2, which are fixedly fastened to respective pilot pistons 6, and pressure lines 10 to chambers 13 in a cylinder 11 in which a double piston 12 is slidable. When the pressure in both chambers 13 is identical, the double piston 12 is held in a central position by springs 25.

Each of the lines 10 has an enlarged terminal portion forming a chamber into and out of which an end portion of the valve spindle 9 moves when the valve is operated. A ball check valve 15 is arranged in the orifice of the spindle 9 in the end portion. An adjustable stop member 14 is mounted in the chamber of the line 10 at a point directly opposite the check valve 15 in the end portion of the valve spindle 9. The stop members 14 are adjusted in such a manner that they will open the check valves 15 and pressure fluid will pass from the pressure line 3 to the lines 10 only when the valve spindles pass a certain position.

Figure 4:
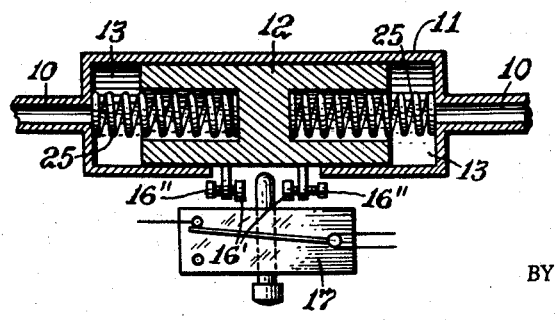
FIG. 4 shows a modified detail of the apparatus of FIG. 1.

The double piston 12 which is moved by differential pressures in the chambers 13 has a circumferential recess 16, the width of which is preferably adjustable and which cooperates with a certain amount of play with the actuating member of an electric switch 17. When moved in either direction from the position shown in FIG. 1, the actuating member will interrupt the flow of current to the solenoids 18 of the valves 8. As shown in FIG. 4, the double piston 12 may, in place of recess 16, be provided with a pair of projecting stop members 16' which are disposed at a distance from each other and are positioned by means of opposite setscrews 16" for adjusting the amount of lost motion of the double piston 12 relative to the actuating member of switch 17.

The solenoids 18 are energized by operating two switches 20 and they cannot move the two valve members 2 and thereby start the press unless both switches 20 are operated simultaneously. If only one of the switches 20 is closed or if it remains closed either intentionally, accidentally, or by being defective, while the other switch 20 moves back to the off position, an automatic safety control mechanism takes over. In the event of faulty switch operation one of the valve members 2 is in a position different from that of the other valve member and the pressures in the two lines 10 are different so that the piston 12 is shifted in one direction or the other and thereby operates the switch 17 to interrupt the entire electric control circuit.

Figure 2:
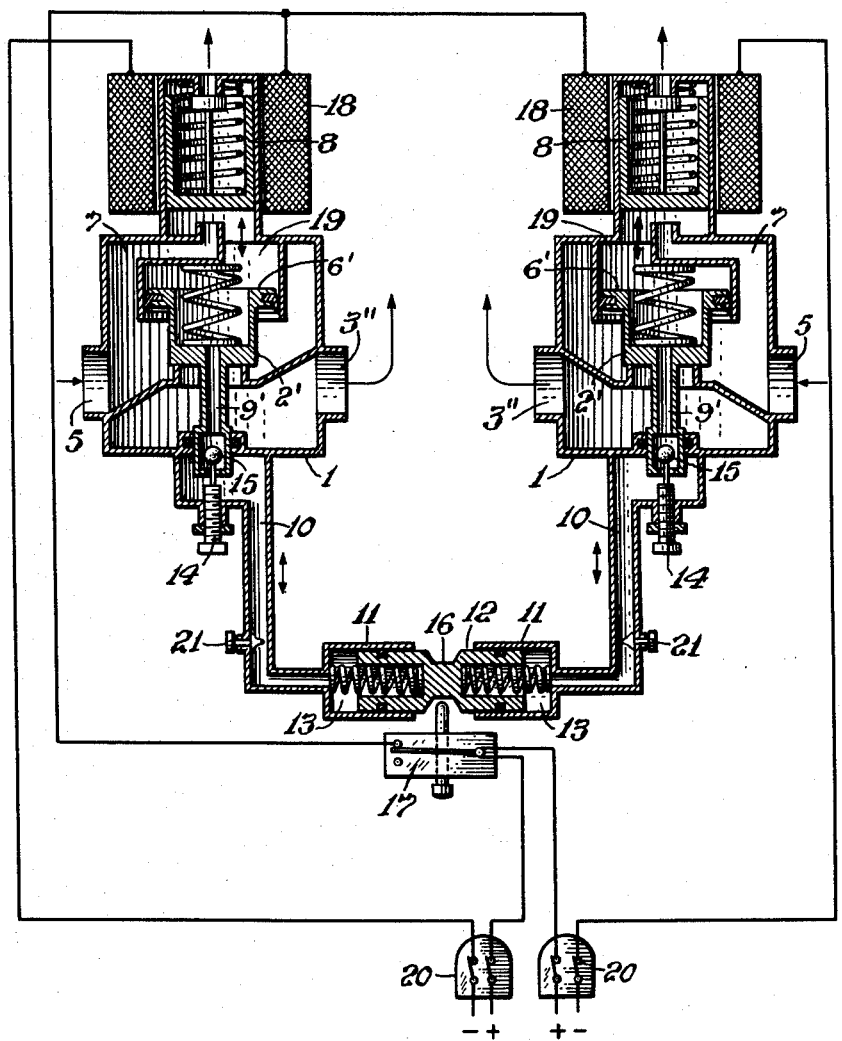
FIGURE 2 shows a similar cross section of a modification of the valve arrangement for controlling the operation of two pressure-consuming elements.

In the modified embodiment of the invention illustrated in FIGURE 2, the two pilot valve solenoids 18 are also energized by switches 20 and each actuate a pilot valve 8 to open a pressure line 7. However, in this embodiment of the invention, the two valves are not connected and have each an inlet 5 and an outlet 3". Valve members 2' are directly secured to respective work pistons 6' and form therewith differential pistons each of which is spring biased towards the closed position and carries a hollow valve spindle 9' which extends into the terminal chamber of a line 10.

The pressure increases and decreases in the work chambers 19 in front of work pistons 6' are transmitted to the chambers 13 for movement of the double piston 12. The ends of the valve spindles 9' are provided with check valves 15 which engage adjustable stop members 14 so as to be opened as soon as the valve spindles have reached a certain predetermined position.

As illustrated in FIGURE 2, check valves 15 open when the valve members 2 are closed, that is, as soon as pressure has been built up in the work chambers 19. As soon as solenoid valves 8 are closed, the pressure in the chambers 19 decreases so that the valve members 2' open the valves and the valve spindles 9' move upwardly, whereupon the check valves 15 close when released by the stop members 14.

If only one of the switches 20 is closed, the resulting difference in pressure between the lines 10 and in the chambers 13 will immediately shift the piston 12 in one direction or the other whereby, in accordance with the preadjusted amount of lost motion allowed by the recess 16 in piston 12, the switch 17 will be operated with a predetermined delay so as to interrupt the entire electric circuit. If one of the pilot valves 8 or work pistons 6' should fail to operate, the piston 12 will also be shifted and thereby actuate the switch 17 to interrupt the circuit. It is not possible then to start the press by closing the two switches 20.

The adjustable lost motion arrangement of the piston 12 shown in FIG. 4 is equally applicable to the apparatus of FIG. 2 and is of considerable importance since it permits to reduce the sensitivity of the safety control mechanism so that it will not react to minor pressure fluctuations within the pressure circuit controlled by the valve arrangements of FIGS. 1 or 2. Piston 12 may move over small distances in cylinder 11 in one or the other direction without acting upon the switch 17. The embodiment of the invention illustrated in FIG. 2 is equipped with manually adjustable throttle valves 21 in the lines 10 which further reduce the effect of minor pressure fluctuations on the safety control mechanism.

The check valves 15 may be sequentially actuated by means of the respective adjustable stop members 14 so as to compensate for time lags in the effects of individual control elements, even including lags in the electrical circuit elements on the movements of the piston 12, or to permit such time lags to be intentionally produced and adjusted in accordance with the desired operation characteristics of the press or other machine tool which is controlled by the valve arrangement. Such time lags in the action of the piston 12 may be of importance, for example, if one of the pressure outlets 3" shown in FIG. 2 is connected to a clutch of a press, while the other outlet 3" leads to a brake of such a press, and if both the clutch and brake controls are started and stopped simultaneously, but the actual operations of the clutch and brake should occur at a certain interval from each other which should be adjustable to be different when the machine is started than when it is stopped. Such a press control may be achieved by means of the embodiments of the invention shown in FIGURE 1 and in FIGURE 3, as described hereinafter. The apparatus according to FIGURE 2 may also be used for controlling the mixing of two liquids and similar purposes. If the flow of one liquid to the mixing vessel should stop, the flow of the other liquid will also be automatically stopped so that the proportions of the two liquids in the mixture will remain unchanged.

The further embodiment of the invention illustrated in FIGURE 3 shows a safety control apparatus similar to that of FIG. 2 which has only one control valve 31 for each of two pressure-consuming devices such as the clutch 22 and brake 23 of a press which are connected through the servo-pressure lines 3 and 3', respectively, and the two valves 31 to the main servo-pressure circuit 45. This main circuit 45 is connected to the pressure inlets 5 of the valves 31 by a multiway valve 40 which contains two valve members 41 and 42. The main circuit 45 is to be automatically shut off by means of valve member 41 as soon as a mechanical or electric failure occurs in one or the other control valve 31. Furthermore, the safety control apparatus should insure that the pressure in the inlets 5 and in lines 3 and 3' up to the clutch 22 and brake 23 will be released through an outlet 43. For this purpose, the multiway valve 40 is provided with two outlets 44 which are connected to respective inlets 5. If valve member 41 is moved in the closing direction by the safety mechanism as will be presently described, valve member 42 will open the outlet 43 so that the pressure in both inlets 5 will be immediately released. If one control valve 31 has failed to operate and another attempt is then made to operate the press by actuating the other valve 31, the main block circuit, inlet 45 will remain blocked and the residual pressure in the apparatus and the lines up to the clutch 22 or brake 23, as the case may be, be released by discharge of fluid through outlet 43.

Valve member 41 may then again be opened and held in the open position by a control knob 46. However, valve member 41 will automatically revert to the closed position when the knob 46 is released as long as one of the control valves 31 is not operating properly.

The safety mechanism of the embodiment shown in FIG. 3 includes a double piston 12' mounted in a cylinder 11' so as to be freely movable therein against the action of return springs 25' which normally maintain the double piston 12' in a central position. The chambers 13' in the cylinder 11' are connected through lines 10' and hollow valve spindles 9 to the outlets 3 on the valves 31 which communicate with the clutch 22 and brake 23 so that the pressure in these machine elements is transmitted to the two cylinder chambers 13' for action on the double piston 12'. If one of the valves should fail to operate or accidentally operate too late, a difference in pressure will occur in the two chambers of the cylinder 11' with the result that the double piston 12' will be shifted from the central position. The double piston has two circumferential recesses 28 divided by a central cylindrical ridge 29 which in the position of the piston 12' shown in FIG. 3 engages a conformingly shaped end portion 24 of the common shaft of valve members 41 and 42 and holds it in a raised position as viewed in FIG. 3. The end portion 24 of the valve shaft is urged to move downward by a compression spring 25". If the double piston 12' is shifted in one direction or the other, the end portion 24 enters one or the other recess 28 and the valve shaft will be moved downwardly by the action of the spring 25" so that the valve member 41 blocks the main pressure circuit 45.

The width of recesses 28 and the size of the central ridge 29 may be made adjustable in a manner analogous to that shown in FIG. 4 so as to enable the double piston 12' during the operation of the apparatus to move over small distances without immediately releasing the valve and to shut off the pressure supply. By varying this lost motion of the double piston it is possible to compensate for fluctuations in the pressure lines, which may be due to a time lag between the operation of the two valves 31. Either with or without such adjustable means it is also advisable to provide an adjustable throttle valve 21 in each line 10'.

In order to insure that the double piston 12' will be properly acted upon when the pressure for operation of the press has been built up and valve members 2 have reached a certain position, the lines 10' are also provided with adjustable check valves 15 at the end of the hollow valve spindles 9 which automatically block fluid flow in the direction toward the measuring piston 12'. Stop members 14 in the terminal portions 26 of the lines 10' may be adjusted to open the check valves 15 in respective positions of the valve members 2.

If the valve members 2 are in their upper, closed positions, the pressure in lines 3, 3' will normally be released through the outlets 4. If one of the valve members 2 should stick, valve members 41 and 42 will be shifted due to the difference in pressure on double piston 12', the supply of additional pressure fluid will at first be stopped entirely, and the pressure within the entire line leading through the affected valve will be released through outlet 43. The pressure remaining in the lines connected with the other valve will be released if another attempt is made to switch on the solenoid valves by hand.

If the pilot valve 8 is switched off and is in the position illustrated in FIGURE 3, the pressure in the valve chamber above the piston 6 will be released through the outlet 27 and the intake pressure will move valve member 2 into the closed position.

The double pistons 12 or 12' shown in FIGS. 1 to 4 may be replaced by diaphragm arrangements which operate respective electric switches or valves by means of suitable connecting rods.

Although my invention has been illustrated and described with reference to preferred embodiments thereof, I wish to have it understood that the invention is in no way limited to the details of such embodiments, but is capable of numerous modifications within the scope of the appended claims.

Having thus fully disclosed my invention, what I claim is:

1. A valve arrangement for a pressure fluid circuit, comprising two valves each including a housing having an intake, an outlet, and a passage for flow of pressure fluid through said housing between said intake and said outlet, a valve member in said housing movable between a passage-opening and passage-closing position, and a pressure fluid actuated motor for actuating movement of said valve member; and control means for controlling the motors of said two valves, said control means including a chamber, a control member dividing said chamber into two portions and movable in said chamber responsive to fluid pressure differences between said chamber portions, said control member including resilient means for maintaining said control member in a predetermined position at a predetermined ratio of fluid pressures in said chambers and adapted to yield when said pressure ratio differs from said predetermined ratio, two conduits respectively connecting said chamber portions to said valve housings for transmitting pressure fluid therebetween, normally closed valve means in each of said conduits and responsive to movement of a corresponding one of said valve members to open said conduit when said valve member passes a predetermined position intermediate said passage opening and said passage closing position thereof, electrically actuated valve means for admitting pressure fluid to said motors, switch means in circuit with said electrically actuated valve means, and connecting means operatively connecting said switch means to said control member for opening and closing said circuit when said control member moves toward and away from said predetermined position thereof.

2. A valve arrangement as set forth in claim 1, wherein said housing has another outlet, said passage also communicates with said other outlet, and said valve member blocks said other outlet when in said passage opening position thereof, and connects said outlets to one another when in said passage closing position.

3. A valve arrangement as set forth in claim 1, wherein said housing defines a cylinder space and valve space, said valve space being a portion of said passage and said valve having an orifice in said space adapted to be opened and closed by said valve member, said motor including a piston member reciprocable in said cylinder space and connected to said valve member for actuating movement of the same, each of said conduits connecting one of said spaces of a respective one of said two valves to a respective chamber portion of said control means.

4. A valve arrangement as set forth in claim 1, wherein each of said conduits has a portion fixedly mounted on said valve member for movement therewith relative to the remaining portion of said conduit, said valve means being mounted on one of said conduit portions, an actuating member being mounted on said remaining conduit portion for opening said valve means during movement of said valve member.

5. A valve arrangement as set forth in claim 1, wherein said connecting means operatively connecting said control member with said switch means includes a lost motion arrangement for opening and closing said circuit only when said control member is moved a predetermined minimum distance toward and away from said predetermined position thereof.

6. A valve arrangement as set forth in claim 5, wherein said lost motion arrangement is adjustable for varying said minimum distance.

7. A valve arrangement for a pressure fluid circuit, comprising two valves, each including a housing formed with two openings therein and a passage connecting said openings; a valve member movable in each of said housings between two positions in which said valve member respectively closes and opens said passage; a hollow valve stem fixedly secured to each of said valve members for joint movement therewith; actuator means for moving said valve member; and actuator control means for controlling said actuator means, said actuator control means including two pressure chambers, double piston means having two face portions respectively extending into said chambers and adapted simultaneously to move inward of one of said chambers and outward of the other chamber under differential pressure of fluid in said chambers against the respective face portions, each of said chambers being formed with an opening, and a respective one of said valve stems being movable in said opening, said one valve stem having an orifice in said chamber and another orifice communicating with one of said openings of the corresponding housing; normally closed valve means in each of said hollow valve stems, adjustable abutment means in said chamber for contact with said valve means when said valve stem moves into an adjustably predetermined position relative to said chamber, said valve means being adapted to be opened by contact with said abutment means, resilient means permanently urging said double piston means into a normal position relative to said chambers under a predetermined differential fluid pressure in said chambers, said resilient means being adapted to yield under differential pressure in said chambers, and means operatively connected to said double piston means and said actuator means of each of said valves for preventing movement of said valve members by said actuator means when said double piston means is moved from said normal position thereof by differential pressure in said chambers different from said predetermined differential pressure.

8. A valve arrangement as set forth in claim 7, wherein said other orifice of said hollow valve stem communicates with one of said two housing openings.

9. A valve arrangement as set forth in claim 7, wherein said means for preventing movement of said valve members by said actuator means includes lost motion means connecting said movement preventing means to said double piston means.

10. A valve arrangement for a pressure fluid circuit, comprising
(a) two valves each including a housing having an intake, an outlet, and a passage for flow of pressure fluid through said housing between said intake and said outlet, a valve member in said housing movable between a passage opening and passage closing position, and a pressure-fluid actuated motor for actuating movement of said valve member; and
(b) control means for controlling the motors of said two valves, said control means including a chamber, a control member dividing said chamber into two portions and movable in said chamber responsive to fluid pressure difference between said chamber portions, said control member including resilient means for maintaining said control member in a predetermined position at a predetermined ratio of fluid pressure in said chambers and adapted to yield when said pressure ratio differs from said predetermined ratio, two conduits respectively connecting said chamber portions to said valve housings for transmitting pressure fluid therebetween, electrically actuated valve means for admitting pressure fluid to said motors, switch means in circuit with said electrically actuated valve means, and connecting means operatively connecting said switch means to said control member for opening and closing said circuit when said member moves toward and away from said predetermined position thereof.

References Cited in the file of this patent

UNITED STATES PATENTS

| | | | |
|---|---|---|---|
| 2,618,931 | Cantley | Nov. 25, | 1952 |
| 2,636,581 | Bitler | Apr. 28, | 1953 |
| 2,774,369 | Di Tirro | Dec. 18, | 1956 |
| 2,906,246 | Di Tirro et al. | Sept. 29, | 1959 |
| 2,909,193 | Hoge | Oct. 20, | 1959 |

UNITED STATES PATENT OFFICE
CERTIFICATE OF CORRECTION

Patent No. 3,068,897            December 18, 1962

Erich Ruchser

It is hereby certified that error appears in the above numbered patent requiring correction and that the said Letters Patent should read as corrected below.

In the grant, line 1, in the headings and lower right-hand corners to the three sheets of drawings and in the heading to the printed specification, line 4, for "Rüchser", each occurrence, read -- Ruchser --.

Signed and sealed this 27th day of August 1963.

(SEAL)
Attest:

ERNEST W. SWIDER
Attesting Officer

DAVID L. LADD
Commissioner of Patents